Patented Aug. 29, 1939

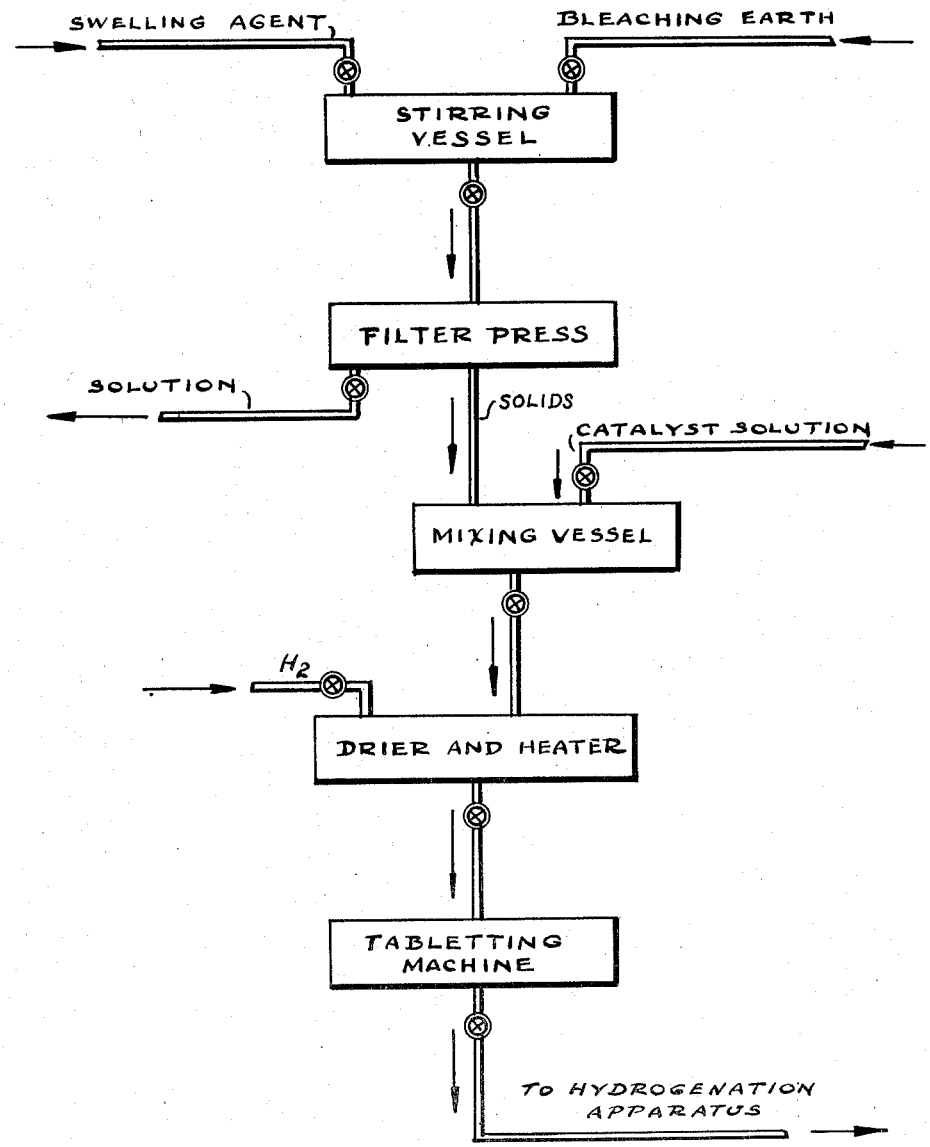

UNITED STATES PATENT OFFICE 2,170,976

PRODUCTION OF HYDROCARBON PRODUCTS BY THERMAL TREATMENT OF MATERIALS CONTAINING CARBON

Mathias Pier, Heidelberg, and Walter Simon, Rudolf Becker, and Fritz Stoewener, Ludwigshafen-on-the-Rhine, Germany, assignors to Standard-I. G. Company, Linden, N. J., a corporation of Delaware Application November 13, 1936, Serial No. 110,710
In Germany November 21, 1935

17 Claims. (Cl. 196—52)

The present invention relates to processes for the production of hydrocarbon products by thermal treatment of materials containing carbon, such as the treatment of distillable carbonaceous materials with hydrogenating gases, and more particularly to the application of substances suitable as catalysts or carriers for catalysts in these processes.

It has already been proposed to use silicates, such as bleaching earths, as catalysts or as carrier substances in such processes. It has also already been observed that it is advantageous to spray these substances with acids or to treat them with fluorine or hydrogen fluoride before use.

It has now been found that the processes for the production of hydrocarbon products can be carried out in an advantageous manner if as catalysts or carriers for catalysts there are applied such bleaching earths which can only be brought to swelling by a protracted treatment with a liquid, and which have undergone a swelling by treatment with a swelling agent.

Among these bleaching earths may be mentioned, for example, Florida earth, "Terrana", fuller's earth, nontronite and the like.

Those bleaching earths which form a jelly-like mass already after a short contact with a liquid, for example, by only sprinkling or impregnating the bleaching earths with the liquid, as, for example, some naturally-occurring bentonites are unsuitable.

The swelling of the bleaching earths is effected by treating same with swelling agents, such as water, aqueous solutions, as, for example, dilute caustic potash solutions, liquid organic compounds of low molecular weight containing oxygen, such as alcohols, ethers, ketones or acids in any suitable form, advantageously under increased vapor pressure of said liquid, in particular at elevated temperatures. Liquid organic compounds of low molecular weight of a polar character, as, for example, unsaturated hydrocarbons of low boiling point or their derivatives, such as halogenated hydrocarbons of low molecular weight or sulphur derivatives, or also normally gaseous carbonaceous compounds of polar character or other gases, as, for example, ammonia, may be used in the liquefied state.

The bleaching earths are brought into contact for at least an hour and preferably for a longer period, as, for example, from 5 to 30 hours, with the liquids in question or their vapors at a temperature which lies below the boiling point of the liquid concerned at the prevailing pressure, but preferably above 30° C., the substance to be swelled preferably being agitated in the liquid, for example, by mechanical means. The swelling agent may, however, also be heated nearly to its critical temperature and the treatment carried out in the neighborhood of the critical pressure. After the treatment, the substance is separated from the liquid and dried at temperatures up to 110° C. or more. The bleaching earths thereby lose the greater part or all of the adherent liquid, but the increased catalytic activity effected by the swelling process remains. The said swelling treatment may also be repeated for two or more times.

In addition to the swelling treatment the bleaching earths may be subjected to a treatment with fluorine or hydrofluoric acid, which treatment may be carried out before or after the swelling treatment, and/or to treatment with other suitable acids such as nitric acid or hydrochloric acid. It may be desirable to give careful attention to the adjustment of a suitable polarity of the swelling agent.

The substances thus prepared may be used as such or preferably as carriers for catalysts. Precipitates of metals or particularly metal compounds may be produced thereon by precipitation from solutions of salts thereof. It may be of advantage to adsorb the catalyst substance from solutions, preferably colloidal solutions, thereof or of catalyst generators on to the bleaching earths, or the earth may be imbibed with a suitable solution and the product dried. Another method of preparing the catalyst is to bring the bleaching earth into contact with a true solution of a catalyst or catalyst generator and, if desired, then to convert the catalyst material into a colloidal form in which it is adsorbed by the bleaching earth. It may be of advantage to incorporate the catalyst substance with the bleaching earth while the latter is still in a highly swollen state, but where more convenient, the incorporation may be carried out after drying. For example, oxides, sulphides, halides or phosphorus compounds of molybdenum, tungsten, uranium, rhenium, zinc, chromium, vanadium, iron, nickel, cobalt, tin, manganese, titanium, lead or mixtures of the same may be incorporated with said bleaching earths. These deposits may, if desired, be after treated with hydrogen, hydrogen sulphide, oxides of carbon or other gases, advantageously at elevated temperatures.

The catalyst may be applied in various forms. The catalyst may be finely divided in the initial material and passed therewith through the reaction space or may be applied after having been brought into a suitable form, such as balls, pellets and the like, stationarily arranged in the reaction vessel, and the reaction product passed thereover in the liquid or gaseous state.

The amounts of catalytic material which may be brought on to the bleaching earths may differ within wide limits according to the particular catalytic material applied as also the particular process in which the contact mass is to be applied. In general, the amount of catalyst material will be 0.1 to 20 per cent of the final contact mass.

The drawing is a flow sheet showing the preparation of the hydrogenation catalyst.

The amount of contact mass to be applied in the production of the hydrocarbon products will vary in general between 0.01 and 30 per cent and more particularly between 0.1 and 5 per cent, calculated on the carbonaceous material.

The expression "treatment with distillable carbonaceous materials of hydrogenating gases" when employed in the present application is intended to comprise various reactions. Thus the expression includes the destructive hydrogenation of carbonaceous materials, such as coal of many varieties, including bituminous coal and lignite, other solid carbonaceous materials such as peat, shales and wood, mineral oils, tars and the products of distillation, conversion and extraction of such carbonaceous materials. The said destructive hydrogenation may be used to produce hydrocarbons of all sorts, such as motor fuels, and in particular anti-knock motor fuels, solvent naphthas, middle oils, kerosene and lubricating oils. It is in destructive hydrogenation, and more especially in the destructive hydrogenation, and more especially in the destructive hydrogenation of middle oils or gas oils to produce benzines that the advantages obtained in accordance with the present invention are of particular importance. The said expression also includes the removal of non-hydrocarbon impurities such as substances containing sulphur or oxygen or nitrogen compounds by the action of hydrogen or gases containing or supplying hydrogen from crude carbonaceous materials for example, the refining by treatment with hydrogen of crude benzol, of crude motor fuels or of lubricating oils. The said expression further includes the stabilization of hydrocarbon fluids, in particular, motor fuels, by rendering the gum forming substances contained therein, in particular, highly unsaturated compounds innocuous. Also the conversion of oxygen- or sulphur-containing organic compounds to produce the corresponding hydrocarbons or hydrogenated hydrocarbons or decomposition products thereof, for example, the conversion of phenols or cresols into the corresponding cyclic hydrocarbons or hydrogenation products thereof is included in said expression. The said expression also includes such reactions as the conversion of cresol to phenol and the conversion of phenol to cyclo-hexanol. The expression also includes the improvement of the properties of motor fuels with hydrogenating gases by an aromatizing or hydroforming treatment or of lubricating oils by hydroforming and quite generally the dehydrogenation of hydrocarbons or the de-alkylation of cyclic compounds by treatment with hydrogenating gases or the hydrogenation of unsaturated hydrocarbons or their derivatives among which are polymerization products obtained from unsaturated gases or liquids, for example, disobutylene, or the hydrogenation of aromatic hydrocarbons.

The said reactions with hydrogen or hydrogen containing gases are usually carried out at temperatures between 250° and 700° C. and as a rule between 380° and 550° C. With particularly active catalysts in accordance with the present invention temperatures of down to about 175° C. may be employed. The pressures employed are usually in excess of 20 atmospheres and as a rule preferably in excess of 50 atmospheres. In some reactions, however, atmospheric pressure or pressure slightly above atmospheric, for example, pressures of 10 atmospheres may be employed. For example, in the refining of crude benzol rather low pressure, for example, of the order of 40 atmospheres give good results. Generally, however, pressures of about 100, 200, 300, 500, and in some cases even 1000 atmospheres come into question.

The amount of hydrogen maintained in the reaction space and parts connected therewith, if any, varies greatly with the nature of the particular initial materials treated or according to the result in view. In general 400, 600, 1000, 2000, 4000, 8000 cubic metres or more of hydrogen measured under normal conditions of temperature and pressure, per ton or carbonaceous material treated may be used.

It is particularly advantageous to operate by continuously introducing fresh carbonaceous materials into the reaction vessel and to continuously remove products therefrom. Sufficiently converted reaction products may be removed following the treatment in any of the reaction vessels. Materials which have not been sufficiently reacted on may be recycled or treated in a separate reaction vessel.

The carbonaceous materials may be treated in the reaction in the liquid, solid or gaseous phase as required.

The reaction is advantageously carried out with streaming hydrogenating gases.

The gases for use in the reaction may consist of hydrogen alone or of mixtures containing hydrogen, for example, a mixture of hydrogen with nitrogen or water gas or of hydrogen mixed with carbon dioxide, hydrogen sulphide, water vapor or methane or other hydrocarbons.

The reaction conditions in each specific case can readily be adjusted by those skilled in the art.

We have also found that improved results are obtained in the production of liquid hydrocarbons from oxides of carbon and hydrogen under atmospheric or increased pressure and in cracking or reforming by working with catalysts or carriers for catalyst substances activated according to the present invention and the expression "processes for the production of hydrocarbon products by thermal treatment" is intended to comprise also these reactions.

The following examples will further illustrate how the invention may be carried out in practice, but it should be understood that the invention is not restricted to these examples. The percentages are by weight unless otherwise stated.

*Example 1*

A German bleaching earth capable of swelling when treated with water for 24 hours at about 100° C. while stirring continuously is subjected to this treatment. After separating the water, the bleaching earth is impregnated with a 10 percent solution of ammonium thiotungstate, dried while excluding air and treated with hydrogen at 400° C. The content of tungsten disulphide in the finished catalyst amounts to 10 percent. The catalyst is pressed into pills and filled into a highpressure reaction vessel. If the vapors of a gas oil from German crude oil be led together with hydrogen under a pressure of 200 atmospheres at a temperature of 425° C. over the catalyst, there is obtained after cooling the vapors leaving the chamber, a product which contains 70 percent of benzine boiling up to 185° C.

If, instead of the bleaching earth having undergone a swelling, the same bleaching earth be used, likewise with 10 percent of tungsten disulphide, but without pretreatment, there is obtained under otherwise identical conditions a product containing only 50 percent of benzine boiling up to 185° C.

*Example 2*

The vapors of a gas oil obtained from German crude oil are passed together with hydrogen under a pressure of 200 atmospheres at 425° C. over a bleaching earth which is likewise capable of swelling when treated with water for 24 hours at about 100° C. while stirring continuously and which has been so pretreated. Thereby 36 percent of the gas oil is converted into benzine. If, however, the non-pretreated bleaching earth is applied as catalyst, then only 25 percent of the gas oil is converted.

What we claim is:

1. A process for the production of hydrocarbon products by treatment of carbonaceous fuels with hydrogenating gases at elevated temperatures which comprises using as carriers for another catalyst a bleaching earth, which can only be brought to swelling by treatment for at least five hours with a swelling agent, and which had undergone such swelling.

2. A process for the production of hydrocarbon products by treatment of carbonaceous fuels with hydrogenating gases at elevated temperatures which comprises using as catalysts bleaching earths which can only be brought to swelling by treatment for at least five hours with a swelling agent and which have undergone such swelling.

3. A process for the production of hydrocarbon products by treatment of carbonaceous fuels with hydrogenating gases at elevated temperatures which comprises working in the presence of bleaching earths which can only be brought to swelling by treatment for at least five hours with a swelling agent, and which have undergone such swelling.

4. A process for the production of hydrocarbon products by thermal catalytic conversion of carbonaceous fuels which comprises using as carriers for another catalyst a bleaching earth which can only be brought to swelling by treatment for at least five hours with a swelling agent, and which has undergone such swelling.

5. A process for the production of hydrocarbon products by thermal conversion of carbonaceous fuels which comprises using as catalysts bleaching earths which can only be brought to swelling by treatment for at least five hours with a swelling agent, and which have undergone such swelling.

6. A process for the production of hydrocarbon products by thermal conversion of carbonaceous fuels which comprises working in the presence of bleaching earths which can only be brought to swelling by treatment for at least five hours with a swelling agent, and which have undergone such swelling.

7. A process for the production of hydrocarbon products by treatment of carbonaceous fuels with hydrogenating gases and a catalyst at elevated temperatures which comprises using as carriers for another catalyst bleaching earths which can only be brought to swelling by treatment for at least one hour with a swelling agent, and which have undergone such swelling.

8. A process for the production of hydrocarbon products by treatment of carbonaceous fuels with hydrogenating gases and a catalyst at elevated temperatures which comprises using as catalyst bleaching earths which can only be brought to swelling by treatment for at least one hour with a swelling agent, and which have undergone such swelling.

9. A process for the production of hydrocarbon products by treatment of carbonaceous fuels with hydrogenating gases at elevated temperatures which comprises working in the presence of bleaching earths which can only be brought to swelling by treatment for at least one hour with a swelling agent, and which have undergone such swelling.

10. A process for the production of hydrocarbon products by thermal catalytic conversion of carbonaceous fuels which comprises using as carriers for other catalysts bleaching earths which can only be brought to swelling by treatment for at least one hour with a swelling agent, and which have undergone such swelling.

11. A process for the production of hydrocarbon products by thermal conversion of carbonaceous fuels which comprises using as catalysts bleaching earths which can only be brought to swelling by treatment for at least one hour with a swelling agent, and which have undergone such swelling.

12. A process for the production of hydrocarbon products by thermal conversion of carbonaceous fuels which comprises working in the presence of bleaching earths which can only be brought to swelling by treatment for at least one hour with a swelling agent, and which have undergone such swelling.

13. The process as claimed in claim 12 which comprises using as swelling agent a liquefied normally gaseous substance.

14. The precess as claimed in claim 12 which comprises using as swelling agent a substance selected from the group consisting of water, aqueous solutions and normally liquid organic compounds of low molecular weight containing oxygen in the vaporous state.

15. The process as claimed in claim 12 which comprises using as swelling agent a liquid organic compound of low molecular weight containing oxygen selected from the group consisting of alcohols, ethers, ketones and acids.

16. The process as claimed in claim 12 which comprises using as swelling agent a substance selected from the group consisting of water, aqueous solutions and liquid organic compounds of low molecular weight containing oxygen.

17. The process as claimed in claim 12 which comprises using as catalyst a bleaching earth selected from the group consisting of Florida earth, "Terrana", fuller's earth, and nontronite.

MATHIAS PIER.
WALTER SIMON.
RUDOLF BECKER.
FRITZ STOEWENER.